US008355396B1

(12) United States Patent
Bloomcamp et al.

(10) Patent No.: US 8,355,396 B1
(45) Date of Patent: Jan. 15, 2013

(54) CUSTOMIZED NETWORK CONGESTION MESSAGING FOR TERMINAL ADAPTERS

(75) Inventors: Eric Bloomcamp, Olathe, KS (US); Jeffery O. Green, Lee's Summit, MO (US); Pierce Gorman, Lee's Summit, MO (US); Russell Huntsman, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1475 days.

(21) Appl. No.: 11/933,823

(22) Filed: Nov. 1, 2007

(51) Int. Cl.
*H04M 7/00* (2006.01)
*H04L 12/66* (2006.01)
(52) U.S. Cl. .................. 370/356; 370/353; 379/219
(58) Field of Classification Search .......... 370/229–240, 370/252, 352–356, 400, 401; 379/88.13, 379/88.17, 74, 84, 219
See application file for complete search history.

(56) References Cited

U.S. PATENT DOCUMENTS

| | | | | |
|---|---|---|---|---|
| 5,341,373 A * | 8/1994 | Ishibashi et al. | | 370/440 |
| 5,506,839 A * | 4/1996 | Hatta | | 370/236 |
| 5,590,132 A * | 12/1996 | Ishibashi et al. | | 370/236 |
| 5,737,314 A * | 4/1998 | Hatono et al. | | 370/235 |
| 5,914,955 A * | 6/1999 | Rostoker et al. | | 370/395.5 |
| 6,115,460 A * | 9/2000 | Crowe et al. | | 379/211.02 |
| 6,430,178 B1 * | 8/2002 | Yahiro | | 370/356 |
| 6,526,282 B1 * | 2/2003 | Kadoshima et al. | | 455/453 |
| 6,614,755 B1 * | 9/2003 | Dote | | 370/230 |
| 6,675,211 B1 * | 1/2004 | Mamaghani et al. | | 709/224 |
| 6,791,973 B1 * | 9/2004 | Yahiro | | 370/352 |
| 6,850,482 B1 * | 2/2005 | Ashdown et al. | | 370/217 |
| 6,967,958 B2 * | 11/2005 | Ono et al. | | 370/401 |
| 7,092,380 B1 * | 8/2006 | Chen et al. | | 370/352 |
| 7,298,733 B2 * | 11/2007 | Sakai et al. | | 370/352 |
| 7,522,607 B2 * | 4/2009 | Bugenhagen et al. | | 370/395.42 |
| 7,788,373 B2 * | 8/2010 | Mamaghani et al. | | 709/224 |
| 7,843,831 B2 * | 11/2010 | Morrill et al. | | 370/235 |
| 7,991,126 B1 * | 8/2011 | Wageman | | 379/88.18 |
| 8,014,510 B2 * | 9/2011 | Bordonaro et al. | | 379/229 |
| 8,213,590 B1 * | 7/2012 | Huntsman et al. | | 379/207.05 |
| 2005/0163126 A1 * | 7/2005 | Bugenhagen et al. | | 370/395.2 |
| 2005/0237978 A1 * | 10/2005 | Segal | | 370/331 |
| 2006/0274721 A1 * | 12/2006 | Flanagan | | 370/352 |
| 2007/0027993 A1 * | 2/2007 | Schwagmann et al. | | 709/227 |
| 2007/0177626 A1 * | 8/2007 | Kotelba | | 370/468 |
| 2008/0002670 A1 * | 1/2008 | Bugenhagen et al. | | 370/352 |
| 2008/0002676 A1 * | 1/2008 | Wiley et al. | | 370/356 |
| 2008/0002716 A1 * | 1/2008 | Wiley et al. | | 370/395.21 |
| 2008/0049615 A1 * | 2/2008 | Bugenhagen | | 370/230.1 |
| 2008/0049624 A1 * | 2/2008 | Ray et al. | | 370/241 |
| 2008/0049625 A1 * | 2/2008 | Edwards et al. | | 370/241 |
| 2008/0049626 A1 * | 2/2008 | Bugenhagen et al. | | 370/241 |
| 2008/0049628 A1 * | 2/2008 | Bugenhagen | | 370/244 |
| 2008/0049629 A1 * | 2/2008 | Morrill | | 370/250 |
| 2008/0049630 A1 * | 2/2008 | Kozisek et al. | | 370/250 |
| 2008/0049631 A1 * | 2/2008 | Morrill | | 370/250 |
| 2008/0049632 A1 * | 2/2008 | Ray et al. | | 370/250 |
| 2008/0049637 A1 * | 2/2008 | Morrill et al. | | 370/252 |
| 2008/0049638 A1 * | 2/2008 | Ray et al. | | 370/252 |
| 2008/0049639 A1 * | 2/2008 | Wiley et al. | | 370/252 |
| 2008/0049640 A1 * | 2/2008 | Heinz et al. | | 370/252 |

(Continued)

*Primary Examiner* — Lisa Hashem

(57) ABSTRACT

A terminal adapter such as a residential gateway or an eMTA is configured to receive a set of signals such as a 403 message from network devices operating in a VoIP network. In response to receiving the signals, the terminal adapter provides audio information to a caller at a telephone. For example, when the caller attempts to make a call, the terminal adapter receives a 403 message which causes the terminal adapter to play an audio file to the caller.

17 Claims, 8 Drawing Sheets

U.S. PATENT DOCUMENTS

| | | | |
|---|---|---|---|
| 2008/0049641 A1* | 2/2008 | Edwards et al. | 370/253 |
| 2008/0049649 A1* | 2/2008 | Kozisek et al. | 370/310 |
| 2008/0049650 A1* | 2/2008 | Coppage et al. | 370/310 |
| 2008/0049745 A1* | 2/2008 | Edwards et al. | 370/389 |
| 2008/0049746 A1* | 2/2008 | Morrill et al. | 370/389 |
| 2008/0049747 A1* | 2/2008 | McNaughton et al. | 370/389 |
| 2008/0049748 A1* | 2/2008 | Bugenhagen et al. | 370/389 |
| 2008/0049753 A1* | 2/2008 | Heinze et al. | 370/392 |
| 2008/0049769 A1* | 2/2008 | Bugenhagen | 370/401 |
| 2008/0049775 A1* | 2/2008 | Morrill et al. | 370/419 |
| 2008/0049776 A1* | 2/2008 | Wiley et al. | 370/419 |
| 2008/0049777 A1* | 2/2008 | Morrill et al. | 370/420 |
| 2008/0049787 A1* | 2/2008 | McNaughton et al. | 370/468 |
| 2008/0049927 A1* | 2/2008 | Wiley et al. | 379/230 |
| 2008/0052206 A1* | 2/2008 | Edwards et al. | 705/34 |
| 2008/0095144 A1* | 4/2008 | Goldberg | 370/352 |
| 2008/0309749 A1* | 12/2008 | Feng et al. | 348/14.01 |
| 2009/0052318 A1* | 2/2009 | Gershinsky et al. | 370/229 |
| 2009/0070406 A1* | 3/2009 | Terpstra et al. | 709/203 |
| 2009/0143085 A1* | 6/2009 | Anderl et al. | 455/466 |
| 2009/0154662 A1* | 6/2009 | Cheng | 379/88.11 |
| 2009/0180379 A1* | 7/2009 | Leung et al. | 370/231 |
| 2009/0268713 A1* | 10/2009 | Ottur et al. | 370/352 |
| 2011/0028133 A1* | 2/2011 | Roach, Jr. | 455/414.2 |
| 2011/0032821 A1* | 2/2011 | Morrill et al. | 370/230 |
| 2011/0040845 A1* | 2/2011 | Cai et al. | 709/206 |
| 2011/0077000 A1* | 3/2011 | Deutsch et al. | 455/424 |
| 2011/0217982 A1* | 9/2011 | Zhao | 455/437 |
| 2011/0267948 A1* | 11/2011 | Koc et al. | 370/235 |

* cited by examiner

CUSTOMIZED NETWORK CONGESTION MESSAGING FOR TERMINAL ADAPTERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Typically, embedded multimedia terminal adapters (eMTA) cannot provide additional processing of a telephone call when a caller encounters congestion in the network. When the caller attempts to make a telephone call that is connected to an eMTA during high call volume, a 403 message is sent back to the eMTA indicating that the call is forbidden or being blocked. The eMTA does not provide dialtone and does nothing further but abandons the telephone call. This result is undesirable and can be improved by providing the caller a similar or same experience as ones encountered when making a telephone call over a public switched telephone network (PSTN). In the PSTN, the caller may continue to get dialtone, an audible tone, or a message. However, no comparable scenario is available in a packet network.

For the reasons discussed above, a solution is needed that allows a user to receive the same tones and messages that are received in a PSTN when congestion occurs. The user should continue to receive dialtone in some cases, an audible tones in other cases, or a message in specific cases.

SUMMARY

The present invention is defined by the claims below. Embodiments of the present invention solve at least the above problems by providing media, method, and apparatus for, among other things, receiving signals at a terminal adapter and allowing the terminal adapter to subsequently deliver an audio response to a caller that is connected to the terminal adapter.

In a first aspect, media for providing information from a residential gateway to a caller during a period of congestion in a network is provided that includes receiving from a network device in the network signals at the residential gateway related to the congestion in the network. In response to the signals, audio information is provided from the residential gateway to the caller. The audio information is stored at the residential gateway.

In another aspect, a method for providing a voice message from a terminal adapter to a caller during an event is provided that includes provisioning the terminal adapter with software, firmware, or both to store the voice message. The voice message is downloaded from a server and stored on the terminal adapter for playback at a later time. A 403 message is received at the terminal adapter. In response to the 403 message, the voice message is provided to the caller.

In yet another aspect, an apparatus for providing information to a calling party during a period of an event in a network is provided that includes a terminal adapter that operates in a packet network connected to at least a session border controller, a call management server, and a network provisioning device. The terminal adapter operates to facilitate a telephone call between the calling party and a called party. The terminal adapter is located in proximity to the calling party or a residence. The terminal adapter operates to receive a signal related to an event in the packet network. The event is congestion. The terminal adapter operates to provide audible information to the calling party in response to the event in the packet network.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
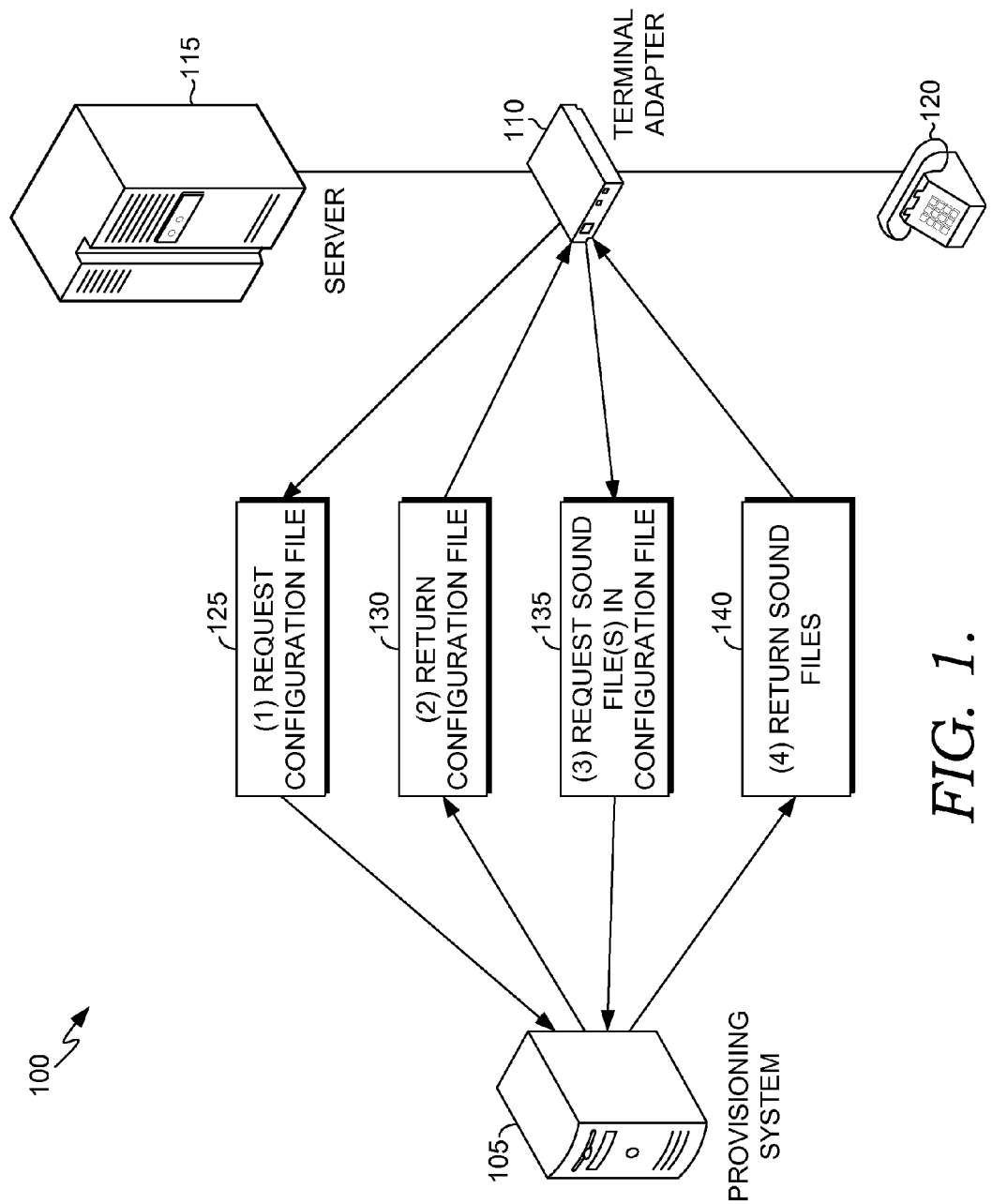
FIG. 1 is a block diagram of an exemplary operating environment illustrating a message flow in a VoIP network during a provisioning stage.

Embodiments of the present invention provide media, method, and apparatus for receiving signals at a terminal adapter and allowing the terminal adapter to subsequently deliver an audio response to a caller that is connected to the terminal adapter.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| ATM | Asynchronous Transfer Mode |
| DSL | Digital Subscriber Line |
| IP | Internet Protocol |
| MTA | Multimedia Terminal Adapter |
| eMTA | Embedded Multimedia Terminal Adapter |
| VoIP | Voice Over Internet Protocol |
| NCS | Network-based Call Signaling System |
| SBC | Session Border Controller |

Further, various technical terms are used throughout this description. A definition of such terms can be found in Newton's Telecom Dictionary by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Customized Network Congestion Messaging

Embodiments of the present invention disclose systems and an apparatus for receiving signals at a terminal adapter and allowing the terminal adapter to subsequently deliver an audio response to a caller that is connected to the terminal adapter. Embodiments of the present invention are discussed below in the several figures illustrating various scenarios in the handling of telephone calls between a service provider and a customer. To provide a better understanding of the present invention, U.S. patent application Ser. No. 11/840,044 entitled "Algorithm to Make Optimal Use of Network Resources During a Mass Calling Event" is herein incorporated by reference.

In FIG. 1, an exemplary operating network 100 illustrating a message flow in a VoIP network during a provisioning stage is shown with a provisioning system 105, a terminal adapter 110, a server 115, and a telephone 120. Network 100 is typically a packet network, such as the Internet. However, network 100 can be specifically a network for handling voice telephone calls such as a VoIP network, a voice over ATM network, or a voice over frame relay network, to name a few. In network 100, data packets flow back and forth carrying signaling and voice messages to their destination. One of ordinary skill in the art is familiar with the various protocols that are involved to accomplish a telephone call made over a packet network such as the ones described above. So, no further details into the interworking of such networks shall be discussed further here.

Provisioning system 105 is represented graphically by a device in FIG. 1. However, provisioning system 105 can be representative of multiple devices. For example, provisioning system 105 can be a set of devices that operate in a service provider's network to facilitate the set up and operations of features with the service provider's customers. When a customer in the service provider's network requests new or additional services, provisioning system 105 can provide the appropriate features or upgrades to the customer over a network connection in network 100. Provisioning system 105 may act as the maintenance interface for problems encountered with the customer's services. Provisioning system 105 may also be the facilitator of installations that occur between the service provider and the customer. The list of functions that may occur at provisioning system 105 may vary according to the desires of the service provider and can include more functions than those described above.

Terminal adapter 110 is a device that resides at a customer's premise. Typically, it may be found in a residential setting but may also be located in commercial facilities. Terminal adapter 110 terminates signals and messages that can be delivered and interpreted by telephone 120. Signals and messages can terminate and originate at terminal adapter 110. Terminal adapter 110 may also handle broadband signals that enable a customer to have Internet access. Terminal adapter 100 may also handle and interface with other applications such as cable television. Exemplary versions of terminal adapter 100 may be identified as a residential gateway due to its location at a customer's residence. However, terminal adapter 100 may also be known ordinarily as an MTA or eMTA. An exemplary eMTA is the Touchstone® TM502 Telephony Modem from the Arris Group of Suwanee, Ga.

Much of the discussion of embodiments of the present inventions focuses on terminal adapter 100 in the form of an eMTA in a PacketCable network. PacketCable is an initiative led by Cable Television Laboratories of Louisville, Colo. to establish specifications for interoperability using IP technology over cable plant. However, embodiments of the present invention may be implemented in other forms using other devices such as a DSL connection with associated devices.

Server 115 represents one or more devices located between the service provider's network in network 100 and a residential customer with terminal adapter 110 and telephone 120. Server 115 can be a call management server or a session border controller. The call management server or the session border controller controls the setting up, conducting, and tearing down of telephone calls. The call management server or the session border controller can manipulate the signaling and media that flows between the service provider's network and the customer's premise. Typically, the call management server and the session border controller have different functions, not mentioned here, but can have overlapping functions as described above. In FIG. 1, provisioning system 105 and server 115 can be considered to be in the service provider's network while terminal adapter 110 and telephone 120 can be considered to be at the customer's premise.

Continuing with FIG. 1, when a customer starts VoIP service with a service provider, terminal adapter 110 requests a configuration file from provisioning system 105 shown in message flow 125. Provisioning system 105 responds by returning the configuration file to terminal adapter 110 in message flow 130. Terminal adapter 110 uses the configuration file to request sound files from provisioning system 105 in message flow 135. Provisioning system 105 delivers the sound files to terminal adapter 110 in message flow 140.

Figure 2:
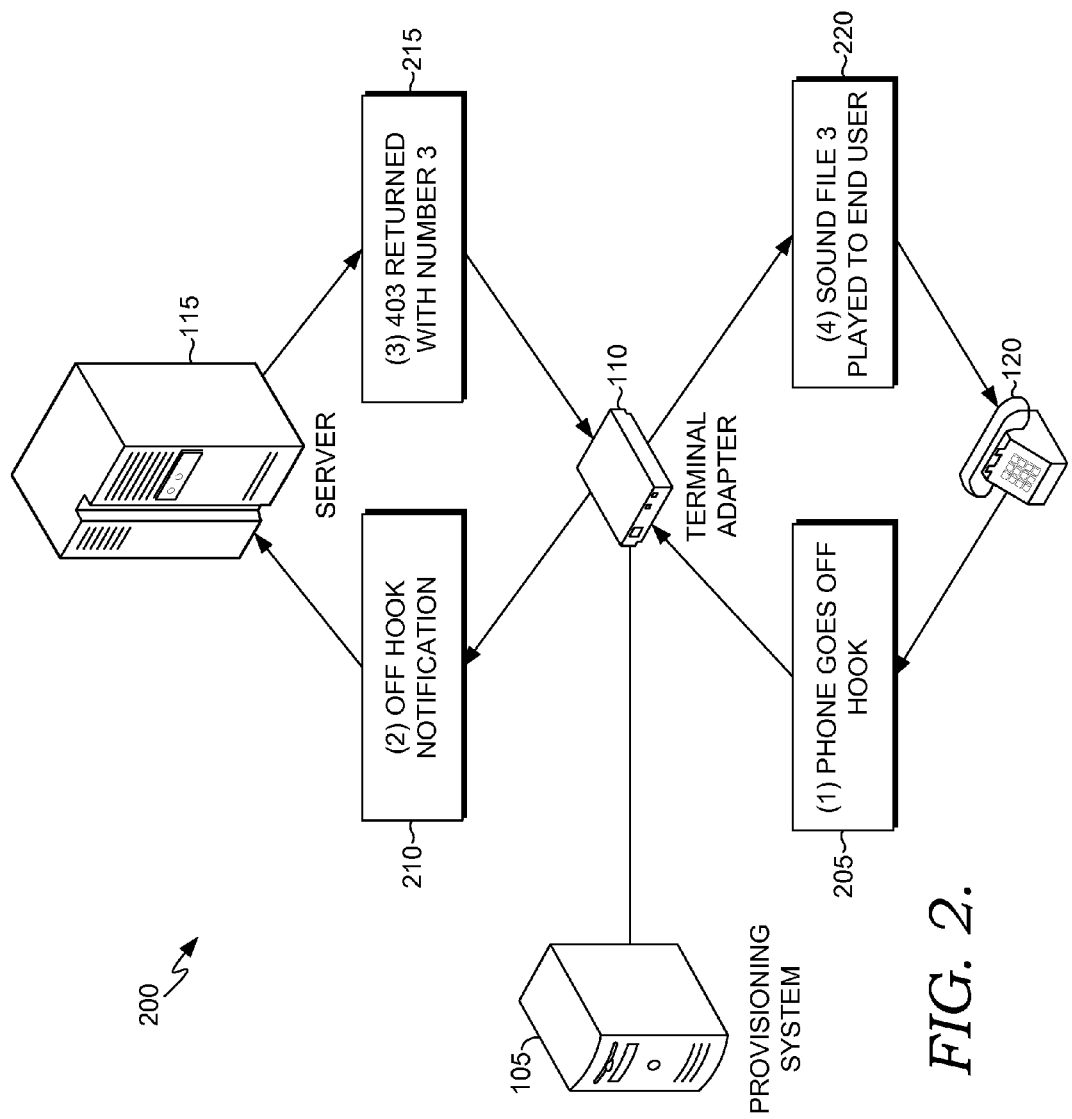
FIG. 2 is a second block diagram of an exemplary operating environment illustrating a message flow in a VoIP network during a network congestion.

Turning now to FIG. 2, an exemplary operating environment illustrating a message flow in a VoIP network during network congestion is shown in a network 200. Network 200 includes the same or similar devices that were discussed in network 100 in FIG. 1. In FIG. 2, network 200 illustrates a scenario of what happens with the creation of a telephone during network congestion.

A caller (or user) can initiate a telephone call at telephone 120. When the caller picks up the handset of telephone 120, an off-hook signal at message flow 205 is sent to terminal adapter 110. Terminal adapter 110 recognizes that a call is being attempted and sends the off-hook notification at message flow 210 to server 115. Server 115 or a device connected to it knows there is congestion in the network. Server 115 may continue to try to connect the telephone call. However, if the congestion is severe enough, server 115 may respond and return a 403 message with an embedded or attached identifier. This identifier can be a unique number as shown in message flow 215. The identifier can be interpreted by terminal adapter 110, and terminal adapter 110 may respond with a set instructions based on the receipt of the identifier. In this case, terminal adapter receives the number "3" along with the 403 message. Terminal adapter 110 plays a sound file associated with the number "3" to the caller at telephone 120. It is noted that when the sound files were delivered to terminal adapter 110, each sound file is associated with a unique identifier that is pre-determined by the service provider. When a 403 message and unique identifier is received at terminal adapter 110, the sound file associated with the unique identifier is delivered to the caller at telephone 120.

The types of sound files that may be delivered to terminal adapter 110 may vary. For example, a sound file can include a dialtone, an audible message, or a tone. Depending upon the circumstances, the service provider may configure a scheme to provide one or more of these types of sound file during an event.

Figure 3:
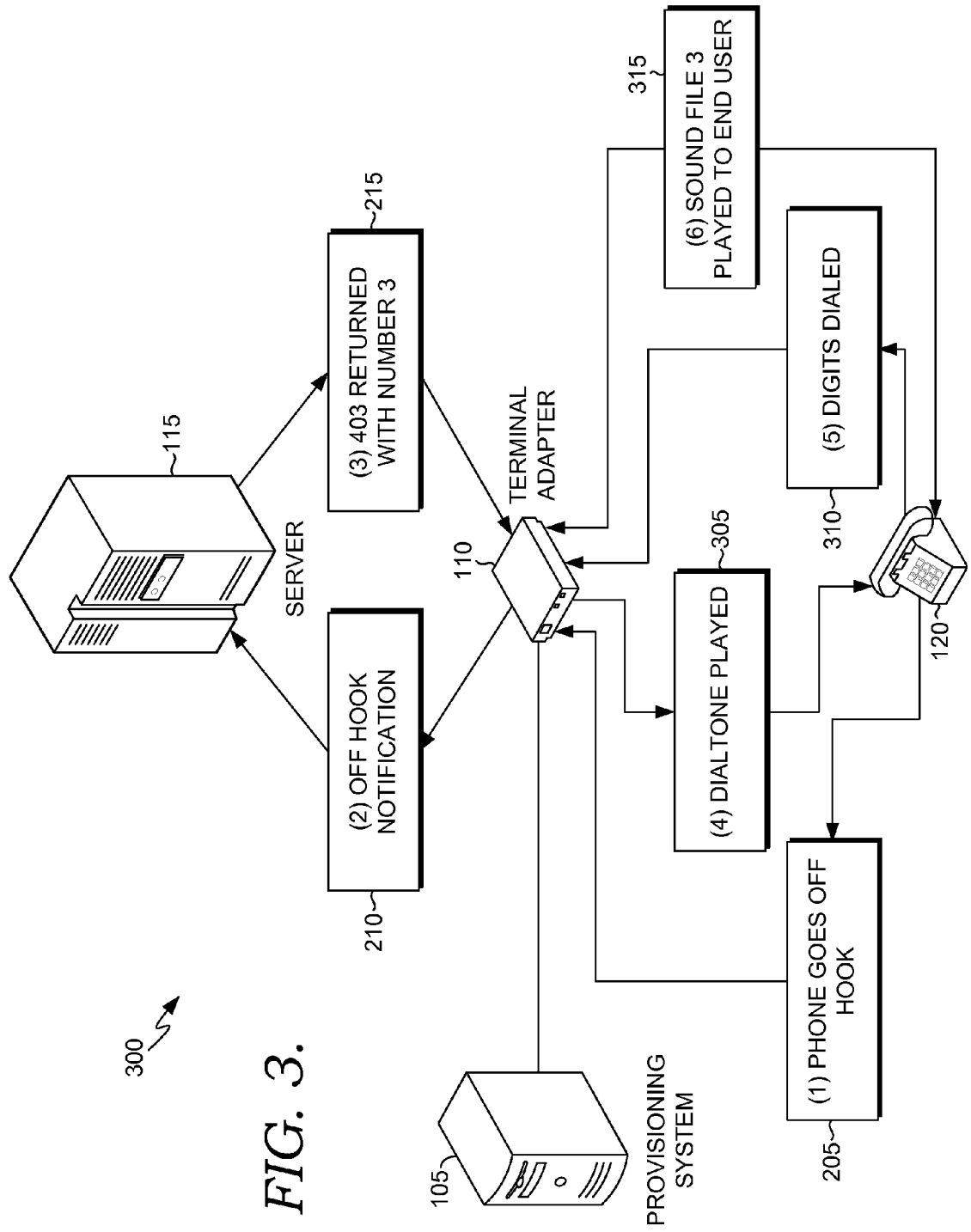
FIG. 3 is a third block diagram of an exemplary operating environment illustrating a message flow in a VoIP network during a network congestion.

In FIG. 3, another exemplary operating environment illustrating a message flow in a VoIP network during a network congestion is shown in a network 300. Network 300 is similar to network 200 for message flows 205, 210, and 215. The call flows are the same up to message flow 215 for both FIGS. 2 and 3. However, once it is determined that congestion is encountered, a 403 message is sent to terminal adapter 110. Terminal adapter 110 can provide a dialtone, message flow 305, to telephone 120 giving the caller the impression that a telephone call is possible. The caller dials the digits, message flow 310, of the party to be called. But since terminal adapter 110 has already received the 403 message or receives an additional 403 message, terminal adapter 110 plays the sound file associated with the number "3" to the caller as shown in message flow 315.

In making a comparison between message flow 220 in FIG. 2 and message flow 315 in FIG. 3, the service provider can implement different types of sounds. For example, message flow 220 may include the delivery of a congestion tone while message 315 may include the delivery of a spoken recording such as "Your call could not be completed at this time, please try your call again later."

Figure 4:
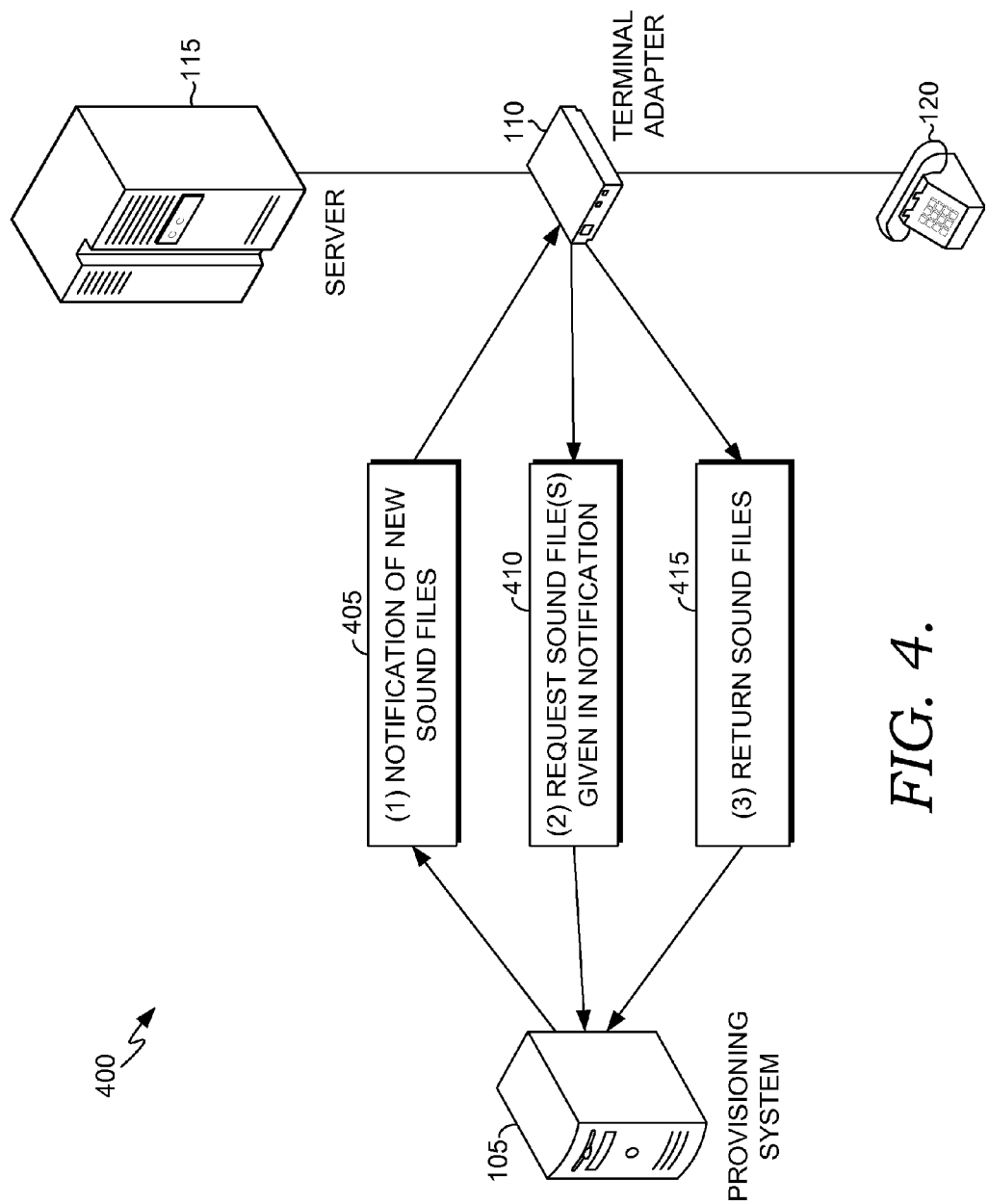
FIG. 4 is a fourth block diagram of an exemplary operating environment illustrating a message flow in a VoIP network during a provisioning stage.

Turning now to FIG. 4, an exemplary operating environment illustrating a message flow in a VoIP network during a provisioning stage is shown in a network 400. In FIG. 4, there are instances where terminal adapter may need to be updated or needs an upgrade. Typically, this happens during the operation of the devices in the service provider's network. When the service provider has updated sound files or re-programmed components in its network, provisioning system 105 may need to notify (message flow 405) terminal adapter 110 of the existence of new sound files. Terminal adapter 110 can request one or more of the sound files as shown in message flow 410 from provisioning system 105. Accordingly, provisioning system 105 returns the sound files as shown in message flow 415 to terminal adapter 110.

Although FIG. 4 illustrates an exemplary embodiment of the present invention, another embodiment can be implemented that may show terminal adapter 110 making an inquiry to provisioning system 105 for new sound files. Or, the sound files could be delivered to server 115 for ultimate delivery to terminal adapter 110.

Figure 5:
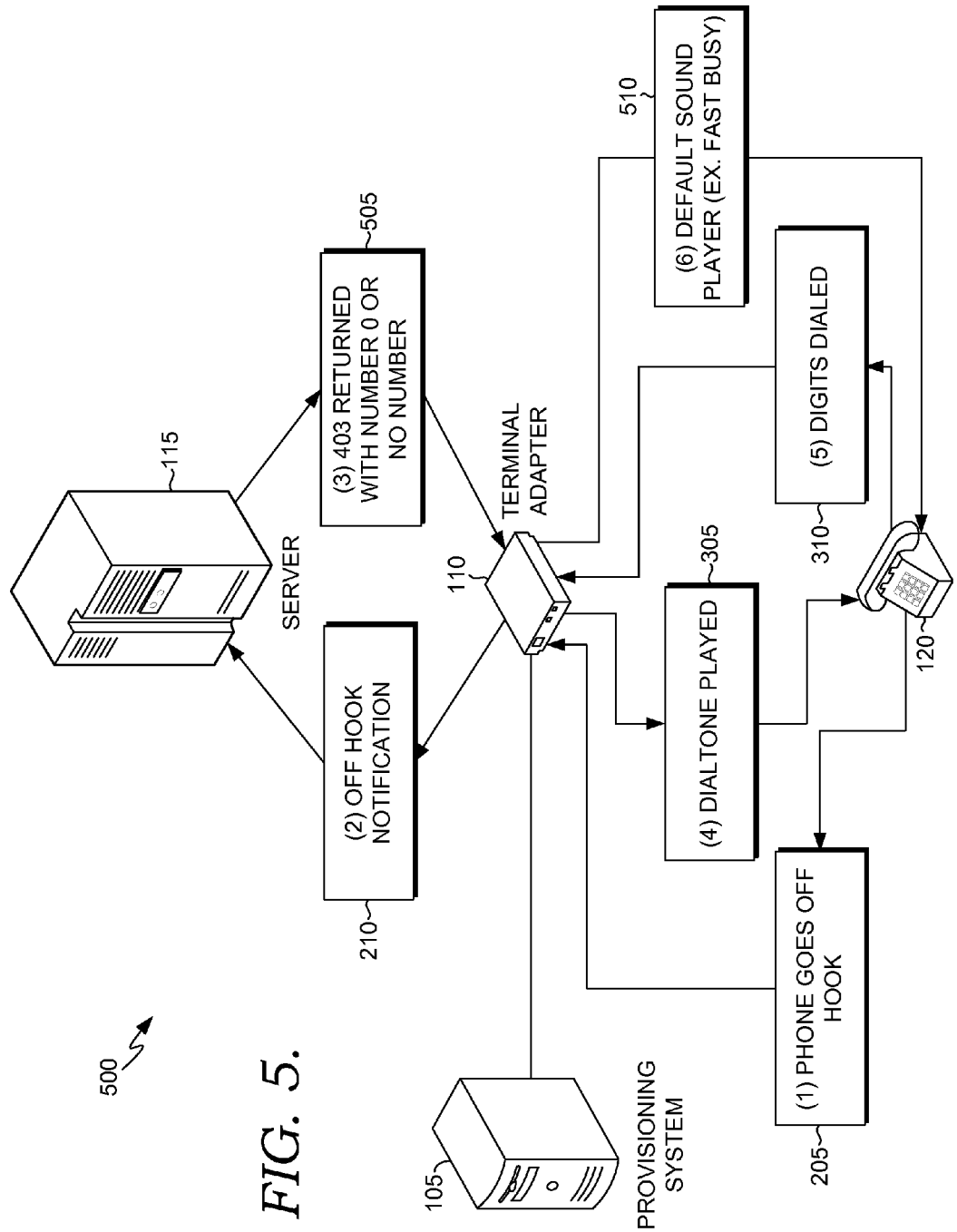
FIG. 5 is a fifth block diagram of an exemplary operating environment illustrating a message flow in a VoIP network during a network congestion.

In FIG. 5, another exemplary operating environment that was illustrated in network 300 in FIG. 3 is shown here as network 500. Network 500 provides a similar illustration as it pertains to the call flow to network 300 with some minor exceptions. Rather than providing a 403 message with the number "3", server 115 provides a 403 message with the number "0" or no number at all as shown in message flow 505 in response to a network congestion. Terminal adapter 110 receives message flow 505 in response to the congestion but still provides dialtone to telephone 120. As done in FIG. 3, the caller dials digits which are received by terminal adapter 110. In response, terminal adapter 110 provides a sound file associated with the number "0" or no number. In message flow 510, the sound file can be a default sound such as a "fast busy" signal encountered when call attempt cannot be completed. However, an implementation of another embodiment of the present invention may use a different sound or alter the scenario illustrated in FIG. 5 completely.

Figure 6:
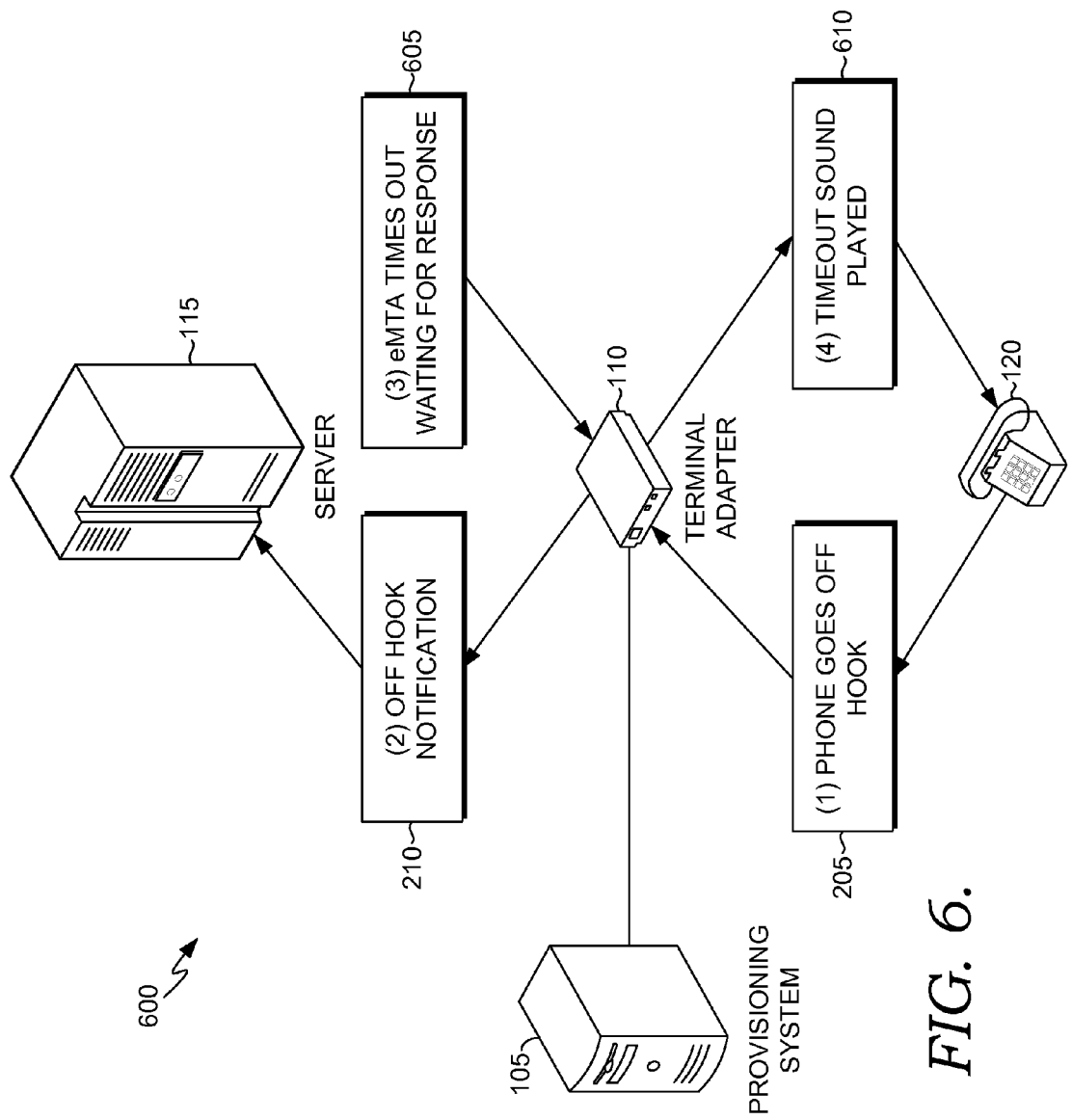
FIG. 6 is a sixth block diagram of an exemplary operating environment illustrating a message flow in a VoIP network during a network congestion.

In FIG. 6, another exemplary operating environment illustrating a message flow in a VoIP network during network congestion is shown in a network 600. Network 600 is illustrative of a scenario when congestion is so severe that devices operating in network 600 cannot provide a response to terminal adapter 110. This scenario is also true for outages that may occur for a variety of reasons.

As discussed earlier, the caller at telephone 120 attempts to make a call and goes off-hook. Terminal adapter 110 provides the off-hook notification to server 115 in the service provider's network. Unfortunately, server 115 may be unavailable or cannot provide a response or acknowledgement to terminal adapter 110. As a result, terminal adapter 110 times out waiting for a response (message flow 605) from server 115. Because of the timeout, terminal adapter 110 can be configured to automatically play a sound file related to this timeout (message flow 610) to the caller at telephone 120. An exemplary message in the sound file may be as follows: "Your call could not be completed at this time. Resources are currently unavailable to connect your call. Please try your call again later."

As shown above, FIG. 6, illustrates the scenario where terminal adapter 110 is configured to respond to the caller when no response or no 403 message is received from server 115. Default sound files can be programmed into terminal adapter 110 when it is provisioned, such as in the illustrations in FIGS. 1 and 4. Terminal adapter 110 is provided intelligence to respond to certain events which aids the transparency experience by users in a PSTN and packet networks as it relates to congestion or outages. Since call scenarios are typically dictated by the events that occur in the PSTN, it is important to provide the same user experience in the packet network.

Figure 7:
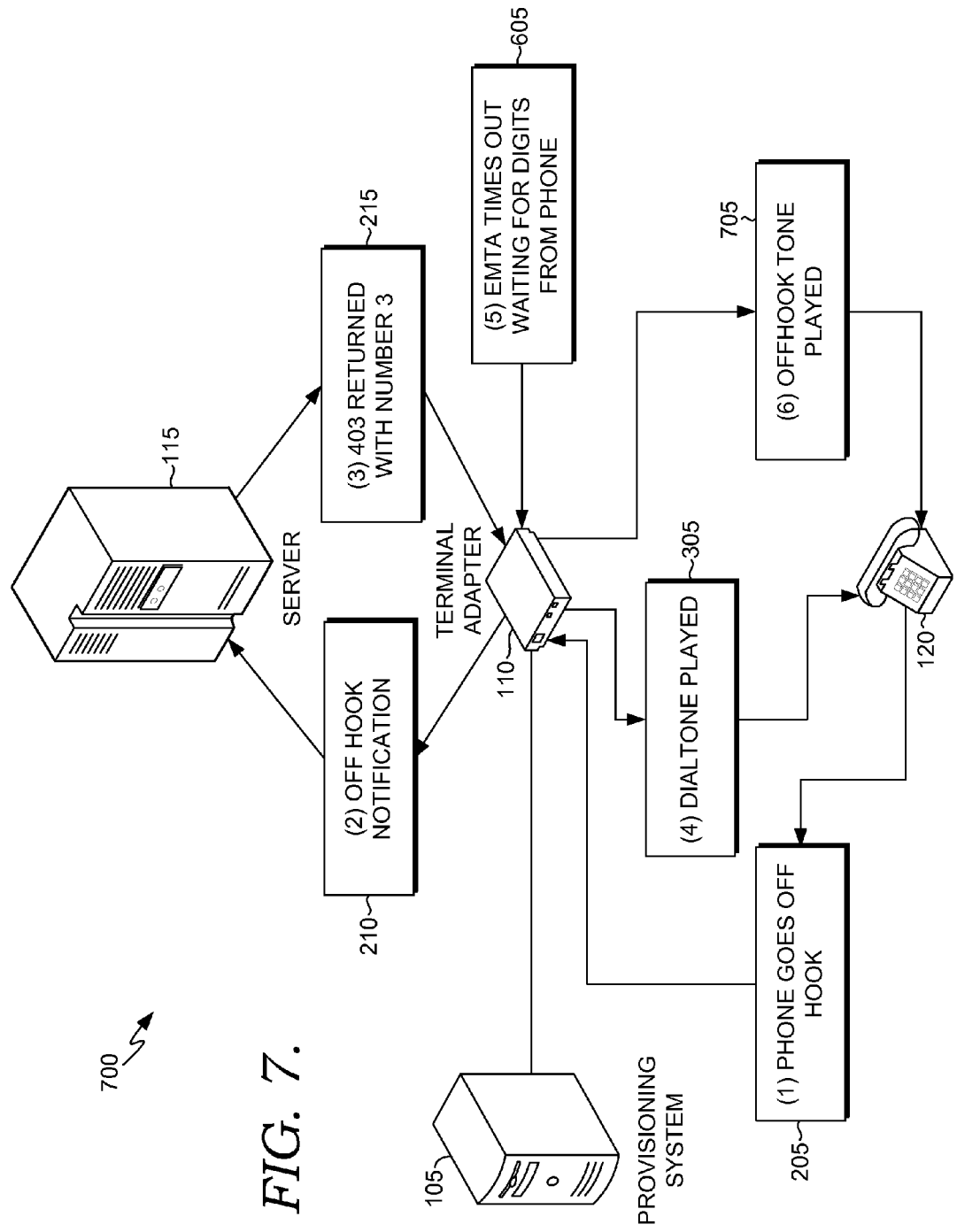
FIG. 7 is a seventh block diagram of an exemplary operating environment illustrating a message flow in a VoIP network during a network congestion.

Turning now to FIG. 7, another scenario is described similar to the scenario in FIG. 6 with a network 700. Earlier figures describe different scenarios for the creation of a telephone call and the handling of any encountered blockage of the telephone call. As discussed above, when server 115 detects congestions or some other event, the 403 message with the number "3" can be sent to terminal adapter 110. As a result, terminal adapter 110 provides dialtone to telephone 120. As discussed above, the caller dials the digits to complete the telephone call. However, in FIG. 7, terminal adapter times out waiting to receive digits from the caller at telephone 120. In this embodiment, terminal adapter 110 is programmed to provide an off-hook tone to the caller at telephone 120.

In each of the FIGS. 1-7, terminal adapter 110 responds to various events based on a sequence of events or received information. In several instances, terminal adapter 110 responds to a 403 message that may have additional embedded or attached information. In other instances, terminal adapter 110 responds to a timeout condition. One of ordinary skill in the art can see that terminal adapter 110 can be programmed or configured to respond to different events. In addition, terminal adapter 110 may store data as well as deliver content to another device such as telephone 120 when certain events occur or when specific information is received or not received.

Figures 8, 9:
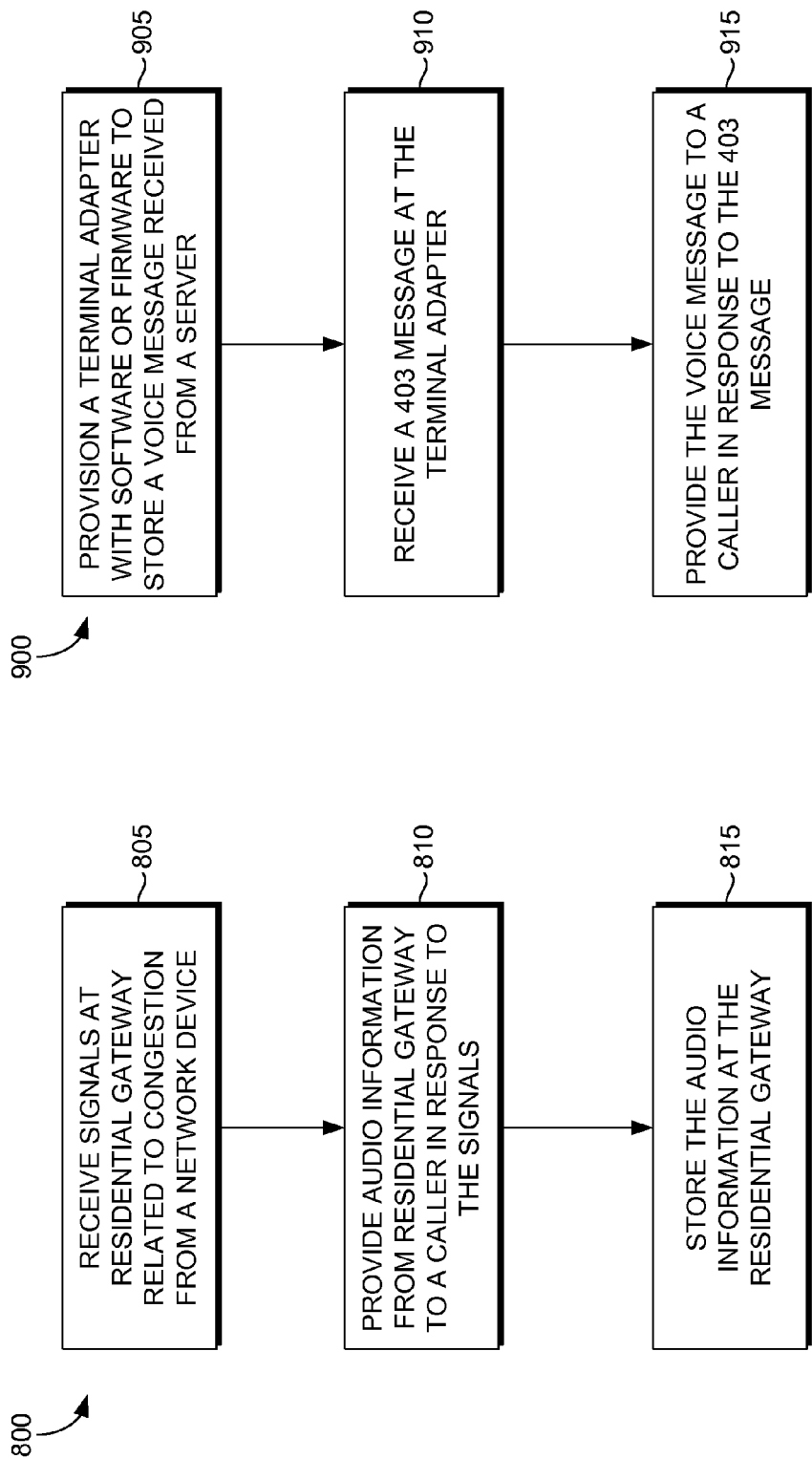
FIG. 8 is a flowchart of an exemplary process for providing intelligence to a residential gateway.
FIG. 9 is a flowchart of an exemplary process for providing a voice message from a terminal adapter to a caller.

In FIG. 8, a process for providing intelligence to a residential gateway is shown in a method 800. Method 800 illustrates the behavior of a residential gateway when certain events occur. The primary stimuli for method 800 is congestion but can also be an outage situation in the network such as networks 100, 200, 300, 400, 500, 600, and 700.

At a step 805, signals, such as a 403 message, are received at the residential gateway. As discussed earlier, the residential gateway is a type of terminal adapter. The signals are provided due to the congestion that is occurring in the network. Typically, the signals are received from a network device such as server 115. In some instances, the signals may include the 403 message bundled with a unique identifier that may be embedded in or attached to the 403 message.

In response to the signals received at the residential gateway, at a step 810, the residential gateway provides audio information to a caller at telephone 120. As discussed above, the audio information, which may be in the form of a sound file, may include a dialtone, a audio message, or a tone. At a step 815, the audio information is stored at the residential gateway.

As method 800 discusses audio information in the singular tense. In an alternative embodiment, several types of audio information may be stored at the residential gateway or played to the caller. FIGS. 1-7 illustrated different embodiments that may be implemented with some of the embodiments implementing the residential gateway, identified as terminal adapter 110, storing and playing multiple sound files.

Turning now to FIG. 9, a process for providing a voice message from a terminal adapter to a caller is shown in a method 900. Method 900 illustrates the scenario of events when a 403 message or a 403 message bundled with additional data is received at a terminal adapter.

At a step 905, terminal adapter 110 is provisioned from provisioning system 105 with software or firmware to store a voice message received from a server. Step 905 illustrates an implementation of an embodiment of the present invention that is different from the ones discussed above. In the discussion above, the voice message or sound file is received from provisioning system 105. However, in this process, the voice message is received from server 115.

At a step 910, a 403 message is received at terminal adapter 110 as illustrated in message flows 215 and 505. As discussed extensively above, the 403 message is received in response to congestion or an outage in the network. Typically, this congestion or outage may be caused by a high volume of telephone calls in the network.

At a step 915, in response to receiving the 403 message, terminal adapter 110 provides the voice message to a caller at telephone 120. The various figures discussed above provide a detailed discussion and illustration of events related to how the voice message is provided to the caller.

The prior discussion is only for illustrative purposes to convey exemplary embodiments. The steps discussed in FIGS. 8-9 may be executed without regards to order. Some steps may be omitted and some steps may be executed at a different time than shown. For example, step 815 may be executed before step 810. Step 910 may be executed before step 905. The point here is to convey that the figures are merely exemplary for the embodiments of the present invention and that other embodiments may be implemented for the present invention.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon for performing a method of providing information from a residential gateway to a caller during a period of congestion in a network, comprising:

receiving from a network device in the network one or more signals at the residential gateway related to the congestion in the network, wherein the residential gateway is selected from a group including a multimedia terminal adapter (MTA), an enhanced multimedia terminal adapter (eMTA), and a voice over internet protocol (VoIP) terminal adapter, and wherein the residential gateway is located at a customer premise or residence;

in response to the one or more signals, providing one or more audio information from the residential gateway to the caller wherein the one or more audio information are stored at the residential gateway; and programming the residential gateway to receive the one or more audio information from a provisioning device in the network.

2. The media of claim 1, wherein programming the residential gateway comprises implementing a scheme whereby a unique identifier is associated with each of the one or more audio information.

3. The media of claim 2, wherein providing the one or more audio information comprises the residential gateway identifying the unique identifier in the one or more signals and playing an audio associated with the unique identifier to the caller.

4. The media of claim 3, wherein the one or more signals are selected from a group including a 403 message, wherein the 403 message indicates a call is forbidden or being blocked.

5. The media of claim 4, wherein the network device is selected from a group including a call management server and a session border controller.

6. The media of claim 4, wherein the one or more audio information and the audio are selected from a group including an audio recording, a tone, and a voice message.

7. A method for providing a voice message from a terminal adapter to a caller during an event, comprising:
provisioning the terminal adapter with at least one of a software and a firmware to store the voice message wherein the voice message is received from a server;
receiving a 403 message at the terminal adapter, wherein the 403 message indicates a call is forbidden or being blocked; and
in response to the 403 message, providing the voice message to the caller.

8. The method of claim 7, wherein the voice message is selected from a first group including an audio recording and a tone.

9. The method of claim 8, wherein the terminal adapter is selected from a second group including a multimedia terminal adapter (MTA), an enhanced multimedia terminal adapter (eMTA), and a voice over internet protocol (VoIP) terminal adapter.

10. The method of claim 9, wherein receiving the 403 message comprises receiving the 403 message from at least one of a call management server and session border controller.

11. The method of claim 10, wherein provisioning the terminal adapter comprises programming the terminal adapter with a numbering scheme whereby a unique number is associated with the voice message.

12. The method of claim 11, wherein providing the voice message to the caller comprises identifying the unique number in the 403 message and playing the voice message associated with the unique number to the caller.

13. An apparatus for providing information to a calling party during a period of an event in a network, comprising:
a terminal adapter operable in a packet network connected to at least one of a session border controller, a call management server, and a network provisioning device, wherein the terminal adapter is located at a customer premise or residence; and
the terminal adapter operable:
(1) to facilitate a telephone call between the calling party and a called party wherein the terminal adapter is located in at least one of a proximity to the calling party and a residence;
(2) to receive a signal related to an event in the packet network wherein the event is a congestion;
(3) to provide an audible information to the calling party in response to the event in the packet network; and
(4) to store the audible information wherein the audible information is received from the network provisioning device in the packet network.

14. The apparatus of claim 13, further comprising the terminal adapter operable to implement a scheme whereby a unique identifier is associated with the audible information.

15. The apparatus of claim 14, wherein the terminal adapter operable to provide the audible information comprises the terminal adapter operable to identify the unique identifier in the signal and to play the audible information associated with the unique identifier to the calling party.

16. The apparatus of claim 15, further comprising the terminal adapter operable to store another audible information associated with another unique identifier, to identify the another unique identifier in the signal, and to play the another audible information associated with the another unique identifier to the calling party.

17. The apparatus of claim 16, wherein the audible information and the another audible information are selected from a first group including a tone and a voice message, and the signal is selected from a second group including a 403 message, wherein the 403 message indicates a call is forbidden or being blocked.

* * * * *